(12) United States Patent
Devarasetty

(10) Patent No.: US 9,148,862 B2
(45) Date of Patent: Sep. 29, 2015

(54) METHODS, SYSTEMS, AND COMPUTER READABLE MEDIA FOR DETERMINING A RADIO FRAME SYNCHRONIZATION POSITION

(71) Applicant: Ixia, Calabasas, CA (US)

(72) Inventor: Prasada Rao Devarasetty, Cary, NC (US)

(73) Assignee: Ixia, Calabasas, CA (US)

( * ) Notice: Subject to any disclaimer, the term of this patent is extended or adjusted under 35 U.S.C. 154(b) by 251 days.

(21) Appl. No.: 13/765,446

(22) Filed: Feb. 12, 2013

(65) Prior Publication Data

US 2014/0226635 A1 Aug. 14, 2014

(51) Int. Cl.
*H04W 56/00* (2009.01)

(52) U.S. Cl.
CPC .......... *H04W 56/0015* (2013.01); *H04W 56/00* (2013.01)

(58) Field of Classification Search
USPC ........................................................ 370/336
See application file for complete search history.

(56) References Cited

U.S. PATENT DOCUMENTS

| | | | | |
|---|---|---|---|---|
| 2010/0091826 | A1* | 4/2010 | Chen et al. | 375/224 |
| 2011/0007717 | A1* | 1/2011 | Swarts et al. | 370/336 |
| 2012/0020240 | A1* | 1/2012 | Miura | 370/252 |
| 2013/0252606 | A1* | 9/2013 | Nimbalker et al. | 455/434 |

OTHER PUBLICATIONS

"3rd Generation Partnership Project; Technical Specification Group Radio Access Network; Evolved Universal Terrestrial Radio Access (E-UTRA); Physical Channels and Modulation (Release 8)," 3GPP TS 36.211, V8.4.0, pp. 1-78 (Sep. 2008).

* cited by examiner

*Primary Examiner* — Michael Thier
*Assistant Examiner* — Yaotang Wang
(74) *Attorney, Agent, or Firm* — Jenkins, Wilson, Taylor & Hunt, P.A.

(57) ABSTRACT

Methods, systems, and computer readable media for determining a radio frame synchronization position are disclosed. According to one method, the method includes receiving a radio frame having an ascertainable physical channel or ascertainable data intended for providing non-synchronization related information. The method also includes determining, using the ascertainable physical channel or ascertainable data, a frame synchronization position.

25 Claims, 8 Drawing Sheets

FIG. 7

METHODS, SYSTEMS, AND COMPUTER READABLE MEDIA FOR DETERMINING A RADIO FRAME SYNCHRONIZATION POSITION

TECHNICAL FIELD

The subject matter described herein relates to testing communications networks. More specifically, the subject matter relates to methods, systems, and computer readable media for determining a radio frame synchronization position.

BACKGROUND

Long term evolution (LTE) and other radio communications technologies can require significant infrastructure and configuration. In LTE and similar networks, data from the network to a user device may be referred to as downlink data and data from the user device to the network may be referred to as uplink data. For example, user equipment (UE), such as a cellular mobile phone, may communicate with an enhanced or evolved Node B (eNode B) via the cellular radio transmission link. Data that is sent from the eNode B to the UE is downlink data, and data that is sent from the UE to the eNode B is uplink data.

Uplink and downlink LTE data is usually transmitted using one or more multiplexing and/or modulation schemes. For example, in some LTE networks, downlink data is transmitted using an orthogonal frequency-division multiplexing (OFDM) and uplink data is transmitted using single carrier frequency-division multiple access (SC-FDMA). Such schemes may allow multiple streams of data to be sent simultaneously (e.g., at different frequencies). While such schemes may allow data to be communicated at high-speed, significant processing is required to encode and decode the data. For example, an eNode B may perform channel coding, multiplexing, and interleaving of data and control streams, which are then sent to the UE over the air (RF) interface. After pre-processing the received signal from the eNode B, the UE may perform channel delineation for downlink physical channels and/or other baseband processing. After separating LTE data from various physical layer channels, the LTE data may be further processed.

LTE frame synchronization is usable for identifying LTE frame boundaries for accurately decoding LTE data. In an LTE frame, there may be a primary synchronization signal and a secondary synchronization signal. Receivers (e.g., LTE-capable user equipment (UE) or other devices) may use these signals in performing LTE frame synchronization to obtain a synchronization position. Generally, receivers perform a frame synchronization procedure that is quick but provides a synchronization position that is a few samples off from a perfect or accurate synchronization position because conventional synchronization techniques for determining accurate synchronization positions require significant resources and/or time. Generally, less accurate synchronization positions may be good enough to decode LTE data during optimal or near-optimal conditions and/or in environments having lower modulation requirements (e.g., networks using four quadrature amplitude modulation (4-QAM) or 8-QAM modulation). However, more accurate synchronization positions may be needed for decoding LTE data in less optimal conditions or in environments having higher modulation requirements (e.g., networks using 64-QAM modulation).

Accordingly, in light of these difficulties, a need exists for improved methods, systems, and computer readable media for determining a radio frame synchronization position.

SUMMARY

Methods, systems, and computer readable media for determining a radio frame synchronization position are disclosed. According to one method, the method includes receiving a radio frame having an ascertainable physical channel or ascertainable data intended for providing non-synchronization related information. The method also includes determining, using the ascertainable physical channel or ascertainable data, a frame synchronization position.

A system for determining a radio frame synchronization position is also disclosed. The system includes a communications interface configured to receive an ascertainable physical channel or ascertainable data intended for providing non-synchronization related information. The system also includes a synchronization module including at least a processor and memory, wherein the synchronization module is configured to determine, using the ascertainable physical channel or ascertainable data, a frame synchronization position.

The subject matter described herein may be implemented in software in combination with hardware and/or firmware. For example, the subject matter described herein may be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" and "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which:

FIG. 7 is a diagram illustrating exemplary synchronization feedback according to an embodiment of the subject matter described herein.

DETAILED DESCRIPTION

Figure 1:
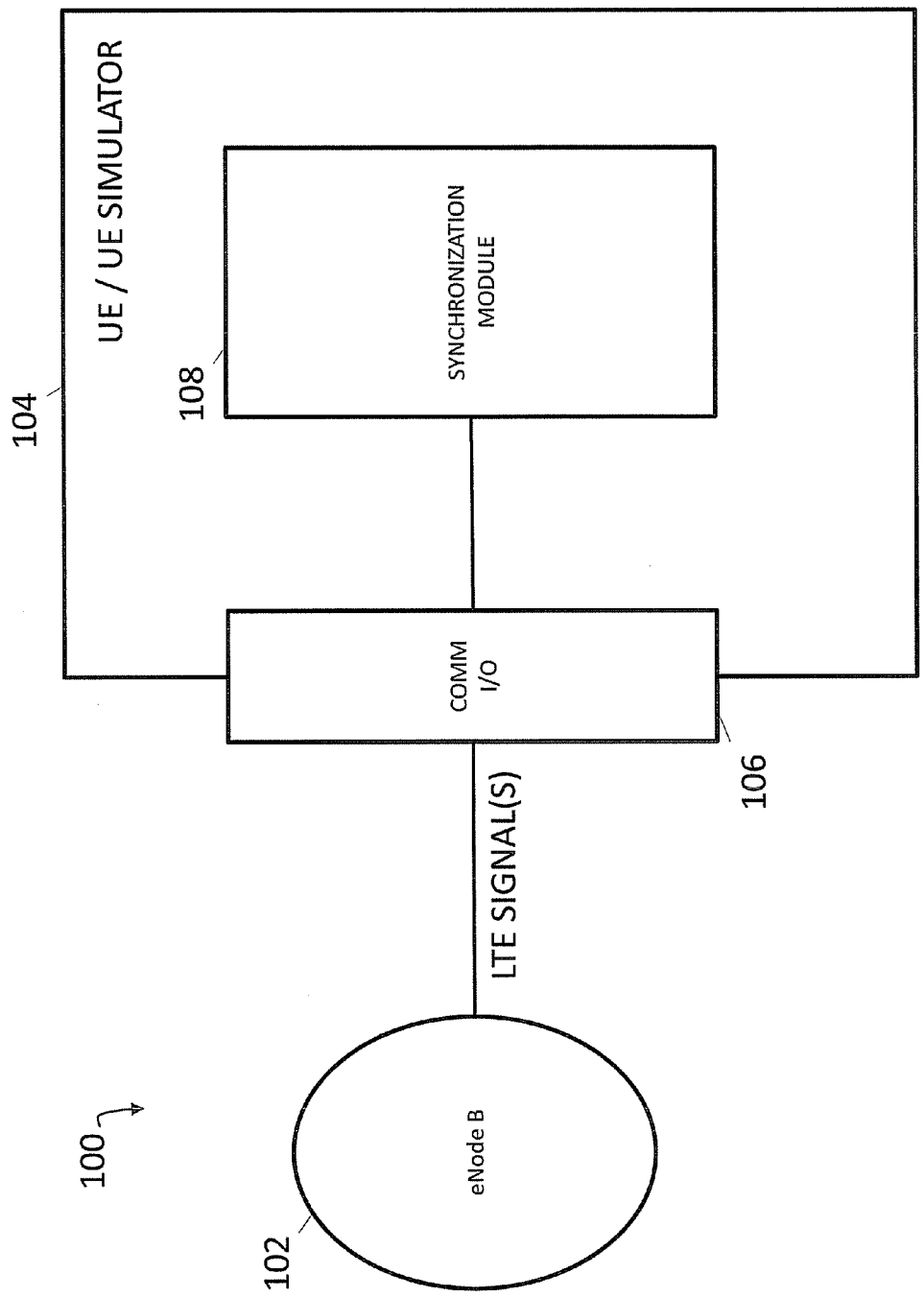
FIG. 1 is a diagram illustrating an exemplary network for determining a radio frame synchronization position according to an embodiment of the subject matter described herein.

The subject matter described herein discloses methods, systems, and computer readable media for determining a radio frame synchronization position. In LTE and LTE advanced systems, data is usually transmitted between an eNode B and UEs via radio frames. Each radio frame generally has parts, such as subframes, that can contain large amounts of data. For example, in a 20 MHz transmission environment, a subframe may include a hundred resource blocks (RBs). RBs may generally be thought of as two-dimensional arrays (e.g., time-frequency grids) of data portions called resource elements (REs). Each RB may contain various configurations or arrangements of REs. That is, each RB may have REs of different physical channels and signals. Moreover, an RB configuration may be different among RBs in a subframe, and RB configurations may also vary among subframes, e.g., based on traffic or network conditions.

LTE frame synchronization is usable to identify LTE frame boundaries for accurately decoding LTE data. LTE frame synchronization may be performed using a time domain based correlation. The time domain based correlation may use a primary synchronization signal (PSS) and/or a secondary synchronization signal (SSS) to find an LTE downlink (DL) frame boundary, e.g., over an entire window of a subframe. The time domain based correlation may detect frame synchronization with a margin of error that is within a few samples of a true or accurate synchronization position. The margin of error may depend on the bandwidth of the LTE signal and channel conditions. For example, the synchronization position may be continuously changing or jittering due to the radio frequency (RF) impairments and clock difference between transmit (Tx) and receive (Rx) clocks associated with an evolved nodeB (eNB) and/or user equipment (UE).

Sometimes the error introduced by a less accurate synchronization position may contribute to phase error in a frequency domain associated with the LTE signal. The phase error may propagate to an equalizer component (e.g., a time domain equalizer (TEQ) or a frequency domain equalizer (FEQ)) and may affect channel estimate and/or compensation. For example, depending on the phase error and various other factors, an equalizer component may have trouble compensating for the phase error, particularly for data encoded in high modulation schemes, such as 64 QAM-encoded data. This is because higher modulation schemes generally increase the likelihood of bit errors, also referred to herein as bit mismatch errors, since constellation points may become closer to each other as modulation increase. Hence, by avoiding errors caused or exacerbated by less accurate synchronization positions, overall DL performance, particularly for 64 QAM and other higher modulation cases, may be improved. For example, by determining a more accurate frame synchronization position, an equalizer and channel decoders (e.g., convolutional and Turbo decoders) may perform better. Further, using a more accurate synchronization position, CRC errors may improve (e.g., CRC errors in LTE data may become less severe or may occur less often over time) and, as such, overall system performance and tolerance for weak signal conditions, such as non-static channel conditions, may increase.

Advantageously, aspects of the subject matter described herein can be used to efficiently detect or determine a more accurate synchronization position by analyzing PCFICH values contained in downlink data and adjusting a base or initial synchronization position depending on whether a decoded PCFICH value matches an ideal PCFICH sequence. PCFICH is generally used for detecting how many control OFDM symbols are present in a current sub frame. For example, PCFICH is a 32 bit sequence used to represent 1, 2 or 3 OFDM symbols for storing control information in a given subframe. Since PCFICH is found in every LTE frame and has a limited range of possible values (e.g., three orthogonal, 32-bit values), a receiver in accordance with aspects of the present subject matter can analyze potential new synchronization positions (e.g., a few samples around an initial synchronization position determined by a correlation method) by decoding PCFICH values using the potential new synchronization positions and checking the decoded PCFICH value for bit errors and/or other errors.

For example, a receiver (e.g., a debug tool or UE device) in accordance with aspects of the present subject matter may fine tune an LTE frame synchronization position by performing PCFICH decode with a target of achieving zero bit mismatch, minimum phase/amplitude error over PCFICH bit sequence. In this example, the receiver may select a window of samples centered at an initial synchronization position that was detected by an initial synchronization method (e.g., PSS and/or SSS correlation method) and may run through all the samples in a window size to pick up the best sample position that results in zero or least bit errors and minimum error.

Aspects of the subject matter described herein may identify and correct a synchronization position more efficiently than normal correlation based frame synchronization and may report to a user or other entity how much a synchronization position is off compared to what was detected initially and/or suggest correct synchronization positions over time.

Additionally, a receiver in accordance with aspects of the present subject matter can process or work with input vectors that are not collected with accurate frame synch. For example, a binary capture file may include LTE data collected during a synchronization slip or problem. The receiver in accordance with aspects of the present subject matter can adjust or correct the synchronization issues using one or more techniques described herein and decode the LTE data. In contrast, conventional receivers (e.g., test devices, debug devices and/or other analysis tools) would be unable to decode the collected LTE data.

FIG. 1 is a diagram illustrating an exemplary network for determining a radio frame synchronization position according to an embodiment of the subject matter described herein. Network 100 may include an evolved nodeB (eNB) 102, and a receiver 104. ENB 102 may represent any suitable entity (e.g., a base transceiver station (BTS), node B, eNode B, a WiMAX base station etc.) for providing LTE or LTE advanced data via an air or wire interface. For example, eNB 102 may be an LTE mobile network entity having functionality similar to that of a radio network controller (RNC) and a base station (BS) in 2G networks or an RNC and a Node B in 3G mobile networks. In some embodiments, eNB 102 may communicate directly with LTE or LTE advanced UEs and may be responsible for header compression, ciphering, reliable delivery of packets, admission control, and radio resource management. ENB 102 may also communicate with various other modules and/or nodes, e.g., receiver 104.

Receiver 104 may be any suitable entity (e.g., a stand-alone node or distributed multi-node system) configured to perform one or more aspects associated with determining an LTE frame synchronization position. In some embodiments, receiver 104 may be a stand-alone tool, a testing device, or software executing on a processor. In some embodiments, receiver 104 may be a single node or may be distributed across multiple computing platforms or nodes.

In some embodiments, receiver 104 may be integrated or co-located with a multiple UE simulator (multi-UE simulator). In such embodiments, the multi-UE simulator may be on a single node or may be distributed across multiple computing platforms or nodes. The multi-UE simulator may include functionality for simulating one or more LTE UEs, sending communications to eNB 102, receiving communications from eNB 102, and/or testing communications capabilities of eNB 102. The multi-UE simulator may also include functionality for storing received downlink data and providing the stored downlink data to one or more modules or components associated with receiver 104.

Receiver 104 may include various modules for performing one or more aspects described herein. Receiver 104 may include a communications interface 106 for communicating with one or more nodes in network 100 and a synchronization module 108 for determining a synchronization position. It will be appreciated that communications interface 106 and synchronization module 108 may include various components, such as hardware components. For example, synchronization module 108 and/or communications interface 106 may include a field-programmable gateway array (FPGA), an application-specific integrated circuit (ASIC), and/or software executing on a processor.

Communications interface 106 may be any suitable entity (e.g., a module, an ASIC, a FPGA, or software executing on a processor) for communicating with various entities, such as eNB 102. Communications interface 106 may include or interact with a radio head or other components for communicating wirelessly. Communications interface 106 may include functionality for communicating via CPRI or other protocols. For example, a CPRI connection may provide downlink data from eNB 102 to communications interface 106 and/or from communications interface 106 to synchronization module 108.

Synchronization module 108 may be any suitable entity (e.g., a module, an ASIC, a FPGA, or software executing on a processor) for performs aspects of the subject matter described herein. In some embodiments, synchronization module 108 may determine an initial synchronization position and may adjust or fine tune the initial synchronization position using an ascertainable channel or data intended for conveying non-synchronization related information. In some embodiments, the ascertainable channel or data may include PCFICH data or other data intended to provide formatting or control data. In some embodiments, the ascertainable channel or data may be frequently or periodically occurring, e.g., the channel may be located in a known location in every frame, subframe, and/or slot. In some embodiments, the ascertainable channel or data may be one of a finite and/or small set of known values.

Synchronization module 108 may be configured to determine a synchronization position using various techniques, such as performing autocorrelation on a PSS and/or SSS or by analyzing a decoded PCFICH value for various samples in a window of LTE data.

Synchronization module 108 may receive live data from eNB 102 or may request and receive stored data (e.g., binary capture data) from memory associated with receiver 104. Synchronization module 108 may receive downlink data from storage and/or components. In some embodiments, synchronization module 108 may include functionality for communicating with communications interface 106 via CPRI or other protocols.

Synchronization module 108 may include functionality for indicating or reporting feedback associated with synchronization. For example, synchronization module 108 may receive feedback during various stages of a synchronization process. The report function may provide this information to a test operator or other user. For example, the report function may provide the information to a graphical user interface in real-time or after testing is complete. The graphical user interface may present the information in various formats, e.g., using text and/or visual aids.

Synchronization module 108 may use feedback information in determining future synchronization positions, adjusting an observed LTE data window, or changing a sample offset amount. For example, synchronization module 108 may maintain past history statistics and suggest similar synchronization positions and/or optimize testing based on observed conditions and/or past behavior.

While synchronization module 108 is described above as being part of receiver 104, other configurations and/or arrangements may be implemented. For example, synchronization module 108 may be a separate or stand-alone node. In another example, a report module may be separate from synchronization module 108 and may provide synchronization feedback.

It will also be appreciated that the above described modules are for illustrative purposes and that features or portions of features described herein may be performed by different and/or additional modules, components, or nodes. For example, aspects of determining an LTE frame synchronization position may be performed by synchronization module 108 and/or other modules. In another example, synchronization module 108 may be distributed across different nodes or computing platforms.

Figure 2:
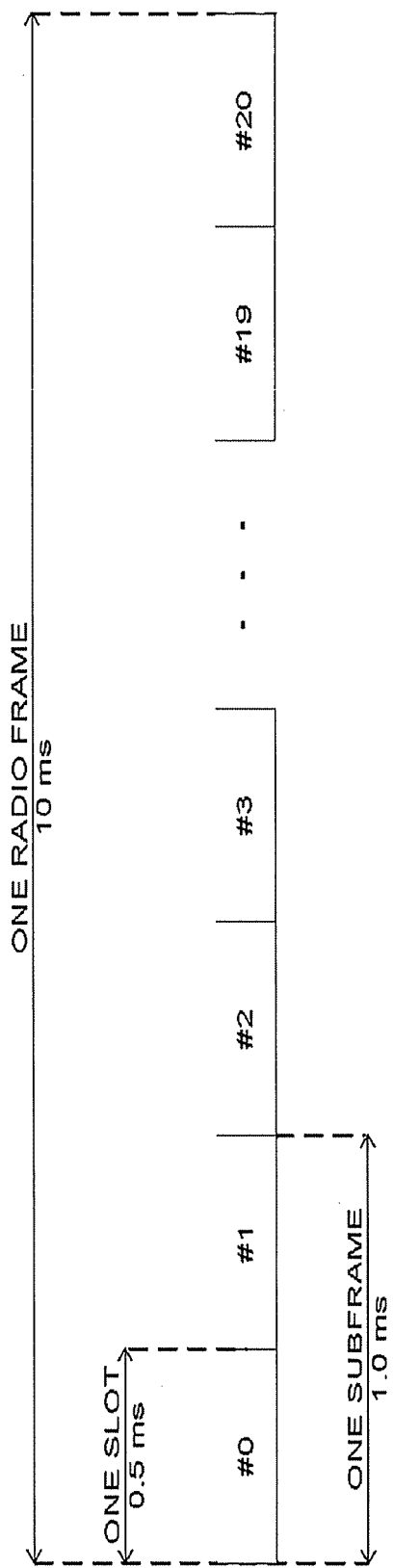
FIG. 2 is a diagram illustrating logical data portions of an LTE radio frame.

FIG. 2 is a diagram illustrating logical data portions of an LTE radio frame. As stated above, uplink and downlink data may be transmitted or sent in LTE radio frames, e.g., from eNB 102 via radio head 104. Each LTE radio frame may be 10 milliseconds (ms) long comprising 10 subframes of 1 ms each. Each subframe may include 2 slots and/or 14 OFDM symbols. A slot may be 0.5 ms long and may include various amounts of LTE data. LTE data may be stored as modulated symbols in sub-carriers within an OFDM symbol. Each modulated symbol in a sub-carrier may typically represent two, four, or six bits. Sub-carriers may be data streams that are spaced 15 kilohertz apart from each other. In some embodiments, an LTE downlink subframe may typically include multiple RBs (RBs) of 12 sub-carriers. The LTE downlink subframe may be partitioned into two equal downlink slots. Each downlink slot may include multiple blocks of 12 sub-carriers with 6 or 7 symbols per sub-carrier (e.g., depending on whether frame uses an extended cyclic prefix or a normal cyclic prefix).

Figure 3:
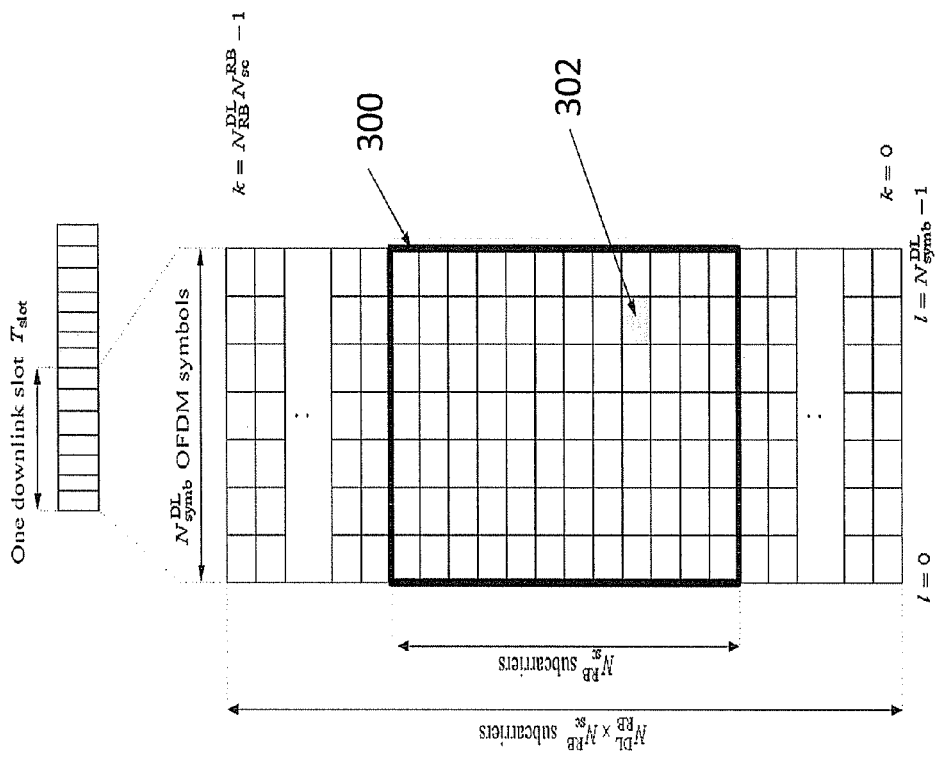
FIG. 3 is a diagram illustrating an exemplary resource element block portion.

FIG. 3 is a diagram illustrating an exemplary resource element block portion. In some embodiments, a complete RB (RB) 300 may include 12 sub-carriers (e.g., data streams at different frequencies), each containing 14 symbols. For example, RB 300 may be logically thought of as a two-dimensional array of resource elements (REs). In FIG. 3, a portion (e.g., half) of an RB 300 is depicted. Resource element 302 represents a logical portion of RB 300. For example, complete RB 300 may include about 168 resource elements, e.g., 14*12=168, depending on cyclic prefix size and/or other variables. Resource element 302 may be data logically located at or identifiable by a unique combination of a time domain value and a sub-carrier or frequency domain value. For example, resource element 302 may include a modulated symbol (e.g., six bits of data) at time x on sub-carrier y.

Resource element 302 may include control information or data (e.g., payload information). In some embodiments, resource element 302 may be associated with a particular LTE channel. For example, the LTE physical layer defines physical channels or signals for carrying particular data (e.g., transport or payload data) and control information. Exemplary channels may include a physical control format indicator channel (PCFICH), a physical downlink control channel (PDCCH), a physical hybrid ARQ indicator channel (PHICH), or a physical downlink shared channel (PDSCH).

As stated above, some resource elements 302 may include PCFICH data. For example, PCFICH data may be located in the first symbol (e.g., column) of RB 300. PCFICH data may decode from a QPSK-encoded sequence of 16 modulation symbols into one of three possible 32-bit sequences. Each sequence may represent one of three possible control format indicators (CFIs), e.g., 1, 2, or 3. CFI may indicate the number of symbols in a subframe (e.g., "columns" of a RB 300) used to transmit control information.

Figure 4:
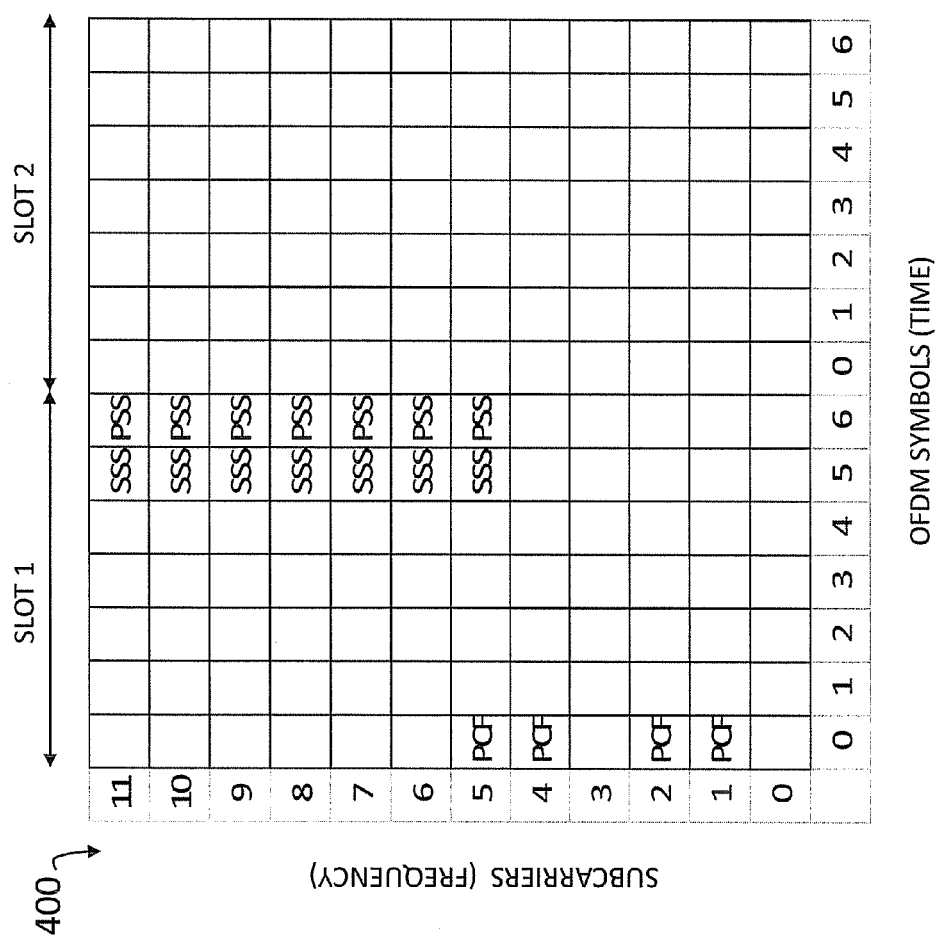
FIG. 4 is a diagram illustrating an exemplary resource block map according to an embodiment of the subject matter described herein.

FIG. 4 is a diagram illustrating an exemplary RB map 400 according to an embodiment of the subject matter described herein. RB map 400 may represent information stored and/or usable to identify locations of PCFICH data and/or synchronization signals (PSS and SSS) in RB 300. RB map 400 may be represented as a time-frequency grid or two dimensional arrays similar to RB 300. For example, RB map 400 may include 12 OFDM signals (e.g., 2 slots) along the 'x' axis and twelve sub-carriers along the 'y' axis.

In some embodiments, RB map 400 may indicate the locations of PCFICH, PSS, and SSS in RB 300 where RB 300 is part of subframe 0 and subcarriers 0-11 of a 1.4 MHz LTE radio frame. Generally, a PSS (labeled "PSS" in FIG. 4) may be mapped into the first 31 subcarriers on either side of a DC subcarrier of an LTE radio frame (e.g., a center subcarrier that contains no information) and may be mapped to the last OFDM symbol in slots 0 and 10 for one frame type (TDD) and may be mapped to the third OFDM symbol in subframes 1 and 6 for another frame type (FDD). In total, six RBs (with five reserved subcarriers on each side) may be used to carry a PSS: Generally, a SSS (labeled "SSS" in FIG. 4) may be mapped into the same number of subcarriers as the PSS and may be mapped to an OFDM symbol that is adjacent to the PSS. PCFICH data (labeled "PCF" in FIG. 4) may be mapped into the first symbol of RB 300. For example, PCFICH data may be located in 4 REs of RB 300. The PCFICH data may use QPSK modulation, where each modulation symbol may represent 2 bits.

As depicted, RB map 400 may indicate 7 REs associated with PSS data, 7 REs associated with SSS, and 4 REs associated with PCFICH data. In some embodiments, synchronization module 108 or another entity may use map RB 400 to identify data related to synchronization. For example, RB map 400 may be used to identify PSS and SSS data. In this example, synchronization module 108 may correlate the PSS and/or the SSS for determining an initial synchronization position. In another example, RB map 400 may be used to retrieve PCFICH data for decoding and analysis.

It will be appreciated that RB map 400 is illustrative and that additional and/or different maps may be stored and/or available to synchronization module 108 or other modules and/or nodes.

Figure 5:
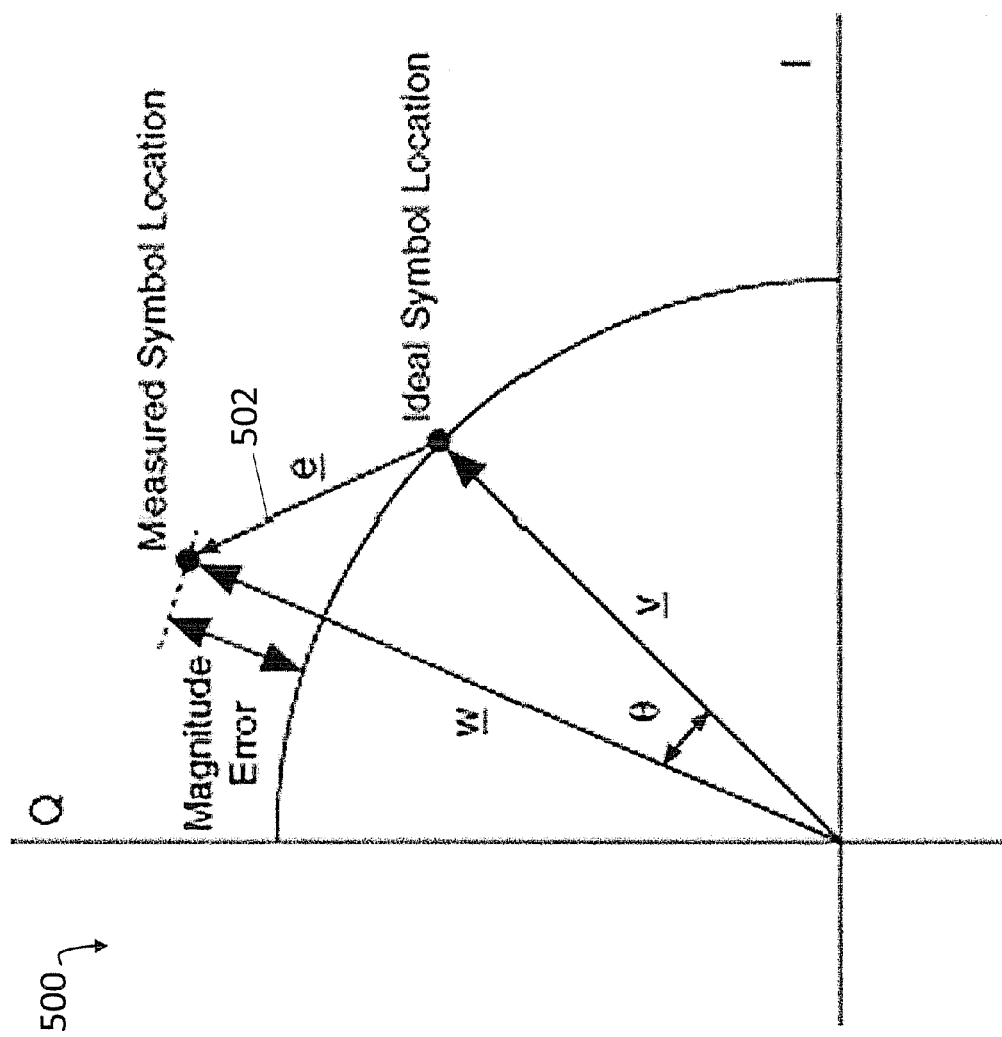
FIG. 5 is a diagram illustrating a portion of a constellation diagram.

FIG. 5 is a diagram illustrating a portion of constellation diagram 500 including an error vector magnitude (EVM) 502. Constellation diagram 500 may be a representation of a signal modulated by a digital modulation scheme. For example, LTE or LTE advanced data may be encoded and modulated using various techniques, such as quadrature phase-shift keying (QPSK), 4-QAM, or 64-QAM. QPSK may be an encoding scheme that allows a higher data transfer rate by encoding two bits per symbol in four different phases.

Constellation diagram 500 may display a signal as a two-dimensional scatter diagram (e.g., points on a complex plane). Constellation diagram 500 may include an 'I' axis (e.g., a horizontal axis) representing in-phase values and a 'Q' axis (e.g., a vertical axis) representing quadrature values. For example, each point on constellation diagram may represent a complex number having a real part (an 'I' value) and an imaginary part (a 'Q' value).

In FIG. 5, a top-right quadrant or phase of constellation diagram 500 is depicted. Constellation diagram 500 may depict an ideal symbol location of a PCFICH sequence. The ideal symbol location may be determined by using one of three possible 32-bit sequences for PCFICH found in Table 5.3.4-1 of the 3rd Generation Partnership Project (3GPP) Technical Specifications 36.212, the disclosure of which is incorporated herein by reference in its entirety.

Constellation diagram 500 may also depict a measured symbol location (e.g., as received). The measured symbol location may be based on an actual PCFICH data observed and may be determined by various techniques, e.g., demodulating a received signal using a phase-shift keying demodulation process to generate an I value and a Q value. The measured symbol location may differ from the ideal symbol location for various reasons, including carrier leakage, phase noise, and/or low image rejection ratio.

Constellation diagram 500 may also depict EVM 502. EVM 502 may generally be used for determining the performance or quality of a digital radio transmitter or receiver. In some embodiments, EVM 502 may indicate the difference between a measured symbol and an ideal symbol. For example, EVM 502 may be represented as a vector between an ideal symbol point and a measured symbol point.

In some embodiments, EVM 502 may be used as an indicator for detecting a more accurate synchronization position. For example, synchronization module 108 may compare an ideal PCFICH value (e.g., one of three 32-bit sequences) to a received decoded PCFICH value. If the decoded PCFICH value matches (e.g., all bits match) the ideal PCFICH value, EVM 502 may be zero and may be a strong indication of a preferred synchronization position.

In some embodiments, synchronization module 108 may also be configured with an acceptable error threshold, such as an EVM threshold. For example, if a computed EVM is within a predetermined EVM threshold, a synchronization position associated with a decoded PCFICH may be used decoding LTE data.

Figure 6:
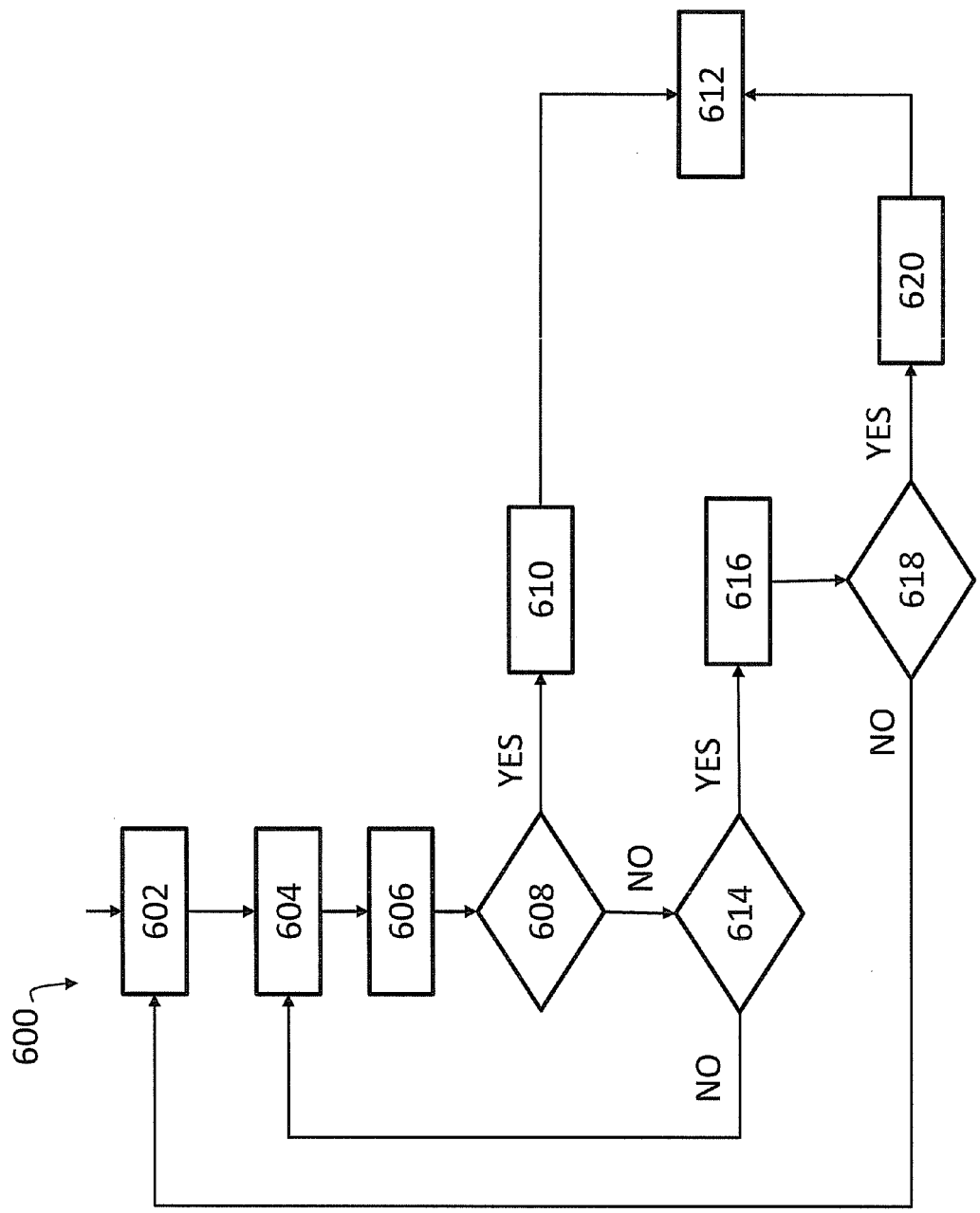
FIG. 6 is a diagram illustrating an exemplary process for analyzing samples surrounding an initial synchronization position according to an embodiment of the subject matter described herein.

FIG. 6 is a diagram illustrating an exemplary process 600 for analyzing samples surrounding an initial synchronization position according to an embodiment of the subject matter described herein. In some embodiments, exemplary process 600, or portions thereof, may be performed by, in, or at receiver 104, synchronization module 108, a report module, a multi-UE simulator, a UE, a communications interface 106, and/or another node or module.

Exemplary process 600 may include one or more of steps 602-620. At step 602, a PSS and SSS synchronization procedure may be performed. For example, a PSS may be based on a frequency-domain Zadoff-Chu sequence and may exhibit zero cyclic autocorrelation at all non-zero lags. In other words, the correlation between an ideal PSS and a received PSS is greatest when the lag is zero. In this example, synchronization module 108 may autocorrelate the PSS. In another example, a SSS may be scrambled sequences and may be interleaved to alternate the sequence transmitted in the first and second SSS transmission in each radio frame. Synchronization module 108 may determine frame timing from observing one of the two sequences. For example, if a first SSS signal is observed in subframe 0 or subframe 5, synchronization can be achieved when the SSS signal is observed in subframe 0 or subframe 5 of the next frame. Using information gather or derived from the PSS and SSS synchronization procedure, an initial synchronization position may be determined.

In some embodiments, after determining an initial synchronization position, the initial synchronization position may be used without adjusting the synchronization position, e.g., without analyzing PCFICH data. For example, if receiver 104 has been experiencing ideal conditions or factors (e.g., low interference or fading), a synchronization position based on a PSS and/or SSS correlation method may be used to decode LTE data. In this example, if receiver 104 determines that factors have changed (e.g., an amount of time has elapsed or higher modulation schemes are being used) or if LTE data cannot be decoded using the synchronization position, additional steps may be performed to adjust the synchronization position.

In some embodiments, after determining an initial synchronization position, a window (e.g., range) of LTE data may be identified, e.g., in the time domain. The window may include a plurality of samples around the initial synchronization position. Using one or more synchronization or sample offsets within the window, a PCFICH value may be decoded and analyzed for bit errors. The synchronization offset that results in a PCFICH value with the fewest or no errors may indicate an appropriate LTE frame synchronization position.

At step 604, a PCFICH sequence may be selected. For example, PCFICH may be transmitted as a 16 bit sequence encoded using QPSK modulation and may decode into one of three possible 32 bit sequences. In this example, synchronization module 108 may select one of three possible 32-bit decoded sequences.

At step 606, a PCFICH value or sequence is decoded. For example, synchronization module 108 may de-map and/or decode PCFICH data stored in a first OFDM symbol of a subframe.

In some embodiments, using I and Q values (also referred to herein as IQ data) associated with PCFICH data, synchronization module 108 may determine an error threshold associated with the PCFICH data. For example, a selected PCFICH sequence (e.g., one of three possible values) may be converted into an ideal IQ value and may be compared to the actual received IQ data for determining an EVM, bit mismatches, or other errors.

At step 608, it may be determined whether the decoded PCFICH value is within an error threshold. In some embodiments, being within an error threshold may include a decoded PCFICH value matching an ideal or selected PCFICH sequence, e.g., the decoded PCFICH value may contain no bit mismatches or other errors. In some embodiments, being within an error threshold may include a decoded PCFICH value having the fewest or least errors of all other decoded PCFICH values analyzed during a given period, frame, or subframe. In some embodiments, being within an error threshold may include an error value associated with the decoded PCFICH being below or equal to a certain value, e.g., a decoded PCFICH value having two or less bit errors.

If a decoded PCFICH value exceeds an error threshold (e.g., if synchronization module 108 selects a wrong PCFICH sequence in step 604), process 600 may continue at step 614. If a decoded PCFICH value is within an error threshold (e.g., a decoded PCFICH is associated with no bit errors), process 600 may continue at step 610.

At step 610, in response to a decoded PCFICH value being within an error threshold, the synchronization position associated with the decoded PCFICH value may be used. For example, if a decoded PCFICH value is associated with a second synchronization position that is a few samples offset from an initial synchronization position determined by correlating a PSS and/or a SSS, the second synchronization position may be used in performing further processing, such as a decoding LTE data. In some embodiments, after determining to use a synchronization position, synchronization feedback 700 may be provided to a user or other entity.

At step 612, a feedback report may be generated. For example, a report module may receive or gather information about synchronization and indicate whether a new synchronization position has been determined, information about the new synchronization position, and/or information about the previous or old synchronization position. In some embodiments, synchronization module 108 or a report module may provide real-time, periodic, or aperiodic feedback.

At step 614, it may be determined whether all PCFICH sequences have been used in analyzing a decoded PCFICH value. If at least one of the possible PCFICH sequences has not been used in analyzing a decoded PCFICH value, process 600 may continue at step 604. If all of the possible PCFICH sequences have been used, process 600 may continue at step 616.

At step 616, a sample offset is performed. For example, performing a sample offset may include increasing or decreasing a synchronization position by one or more samples, e.g., in the time domain. In this example, PCFICH data may be decoded and analyzed using a frame or subframe as defined or identified by the changed synchronization position.

At step 618, it is determined whether all sample offsets within a window of LTE data is explored. If at least one sample offset has yet to be explored (e.g., the new sample offset at step 616), process 600 may continue at step 604. If all sample offsets are explored (e.g., the new sample offset at step 616 is outside the window), process 600 may continue at step 620.

At step 620, in response to all sample offsets in the window being explored and no explored synchronization positions being within an error threshold, the initial synchronization position (e.g., determined by correlation of the PSS and/or SSS) may be used. For example, the initial synchronization position may be used in performing further processing, such as a decoding LTE data. In some embodiments, after determining to use an initial synchronization position, synchronization feedback 700 may be provided to a user or other entity.

It will be appreciated that the above described processing sequence is for illustrative purposes. In some embodiments, a processing sequence may include additional and/or different processing steps and/or steps may occur in a different temporal order.

Figure 7:
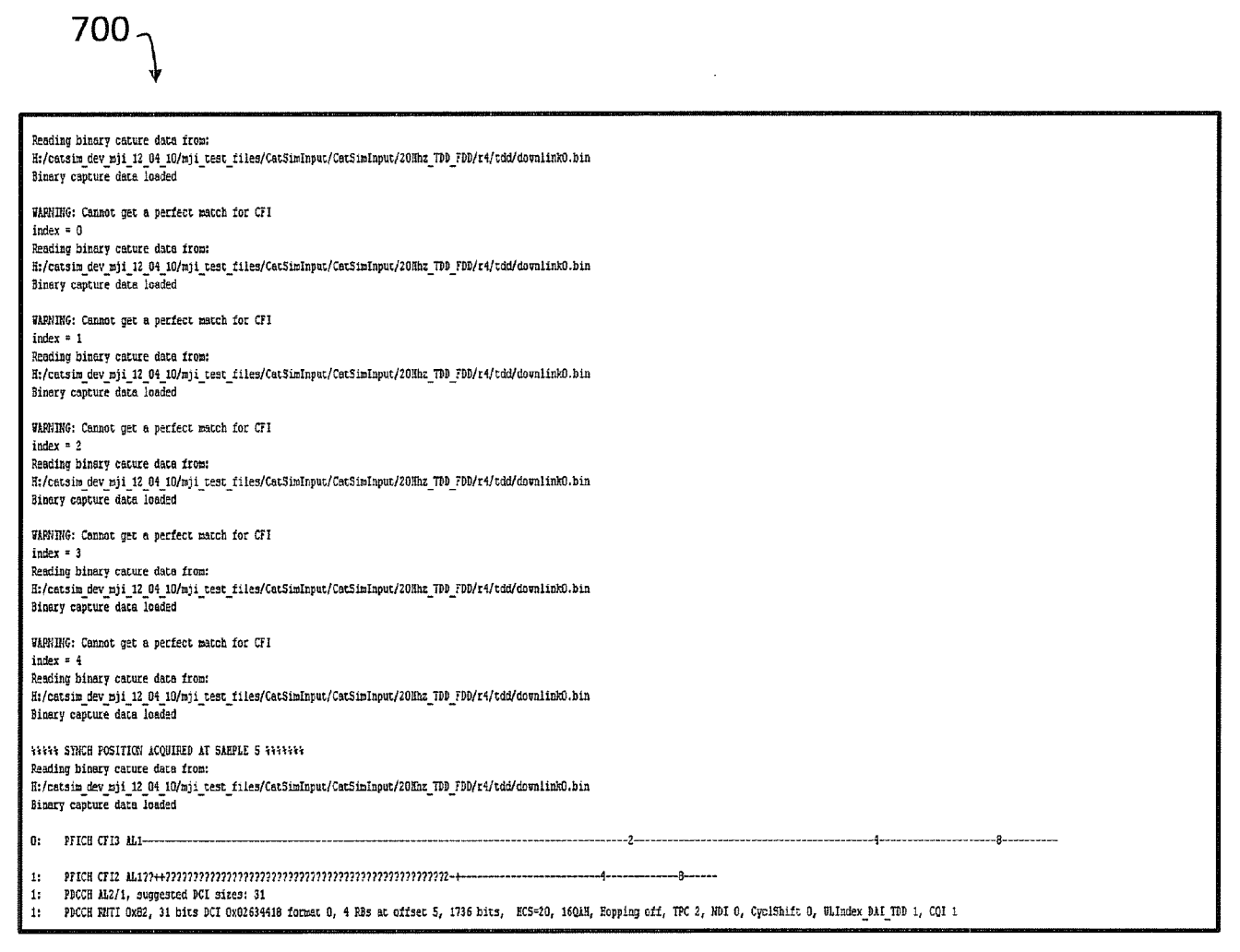

FIG. 7 is a diagram illustrating exemplary synchronization feedback 700 according to an embodiment of the subject matter described herein. Synchronization feedback 700 may include any synchronization-related information related to one or more aspects of the present subject matter. For example, synchronization feedback 700 may include information generated, derived, or obtained from synchronization module 108. Synchronization feedback 700 may be provided to a user or entity via various means, such as a graphical user interface (GUI) and a message, and/or may be stored in memory for later review.

In some embodiments, synchronization feedback 700 may include a report to a test operator, an end user, or another entity, such as a test platform or multi-UE simulator. Synchronization feedback 700 may provide various information and statistics for about testing, PCFICH analysis, and/or explored synchronization positions. In some embodiments, an explored synchronization position may be identified by index values. The index values may be in relation to an initial synchronization position, e.g., positive integers for positions ahead of the initial synchronization position and negative integers for positions behind the initial synchronization position. Synchronization feedback 700 may indicate whether one or more indexes results in a perfect match for CFI (PCFICH data). In some embodiments, synchronization feedback 700 may include information about errors associated with decoded PCFICH data, such as a number of bit errors associated with each explored sample offset. Synchronization feedback 700 may include information about the LTE data (e.g., a file location of binary capture file) being explored or analyzed.

In some embodiments, synchronization feedback 700 may indicate or identify a new synchronization position and may include information about the new synchronization position, such as a decoded PCFICH value (e.g., a CFI value).

Figure 8:
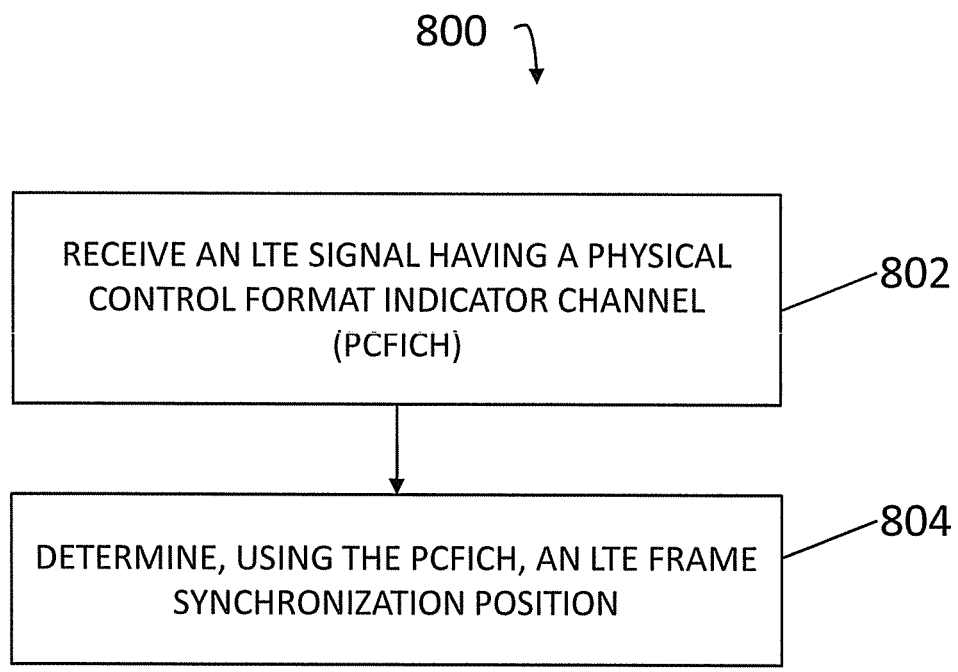
FIG. 8 is a diagram illustrating an exemplary process for determining a radio frame synchronization position according to an embodiment of the subject matter described herein.

FIG. 8 is a diagram illustrating an exemplary process 800 for determining a radio frame synchronization position according to an embodiment of the subject matter described herein. In some embodiments, exemplary process 800, or portions thereof, may be performed by, in, or at receiver 104, synchronization module 108, a report module, a multi-UE simulator, a UE, a communications interface 106, and/or another node or module.

Exemplary process 800 may start at step 802. At step 802, an LTE signal having a physical control format indicator channel (PCFICH) may be received. For example, a radio frame, such as an LTE frame or LTE-advanced frame, may be received at receiver 104 from a testing platform, an evolved packet core (EPC) network node, a serving gateway, a packet data network gateway, an evolved Node B, a Node B, a WiMAX base station, an EPC network, or a base transceiver station (BTS).

At step 804, a frame synchronization position may be determined using the PCFICH. For example, a window (e.g., a range) of LTE data around an initial synchronization position may be analyzed. The window may include samples before and after the initial synchronization position. Using one or more synchronization offsets within the window, a PCFICH value or other ascertainable data associated with the synchronization offsets may be decoded and analyzed for bit errors. The synchronization offset that results in a PCFICH value or other ascertainable data with the fewest or no errors may indicate an appropriate radio frame synchronization position.

In some embodiments, synchronization feedback may be provided before, during, or after determining the frame synchronization position. For example, feedback 700 may be provided to user via an UI or other means. In this example, feedback 700 may include information about a current LTE signal sample or related data being analyzed.

In some embodiments, determining a radio frame synchronization position may include determining an initial synchronization position and adjusting the initial synchronization position using decoded PCFICH values associated with surrounding positions. In some embodiments, an initial synchronization procedure may correlate a PSS and/or a secondary synchronization signal associated with a received LTE signal.

In some embodiments, determining a radio frame synchronization position may include selecting a plurality of samples around an initial synchronization position, decoding a first PCFICH value associated with a first sample of the plurality of samples, determining whether a first PCFICH value is within an error threshold, and in response to determining that the first PCFICH value is within the error threshold, identifying the frame synchronization position using the first sample.

In some embodiments, in response to determining that a first PCFICH value is outside an error threshold, one or more different samples from a plurality of samples may be processed until a decoded PCFICH value is within the error threshold and in response to determining that the decoded PCFICH value is within the error threshold, an LTE frame synchronization position may be identified using the associated sample.

In some embodiments, an error threshold may be associated with a bit mismatch error value, a phase error value, an amplitude error value, a combination of two or more error values, or a combination of phase and amplitude error values.

In some embodiments, determining whether a first PCFICH value is within an error threshold may include determining that the first PCFICH value is decoded with no errors.

In some embodiments, a plurality of samples may include some samples before an initial synchronization position and some samples after an initial synchronization position. In some embodiments, a sample may be LTE data at a certain point in a time domain.

While some of the above description has been directed towards LTE frame synchronization, aspects of the subject matter described herein may be used for any wireless or radio technology where frame synchronization is beneficial. For example, radio frame synchronization may be performed in various radio-based networks, e.g., Wi-MAX and/or LTE-advanced networks, where a synchronization position may be important when decoding data stored in a radio frame. In this example, any ascertainable channel or data (e.g., a channel intended to convey formatting or control information) may be decoded and analyzed to adjust an initial synchronization position. The ascertainable channel or data may be frequently occurring, e.g., the channel may be located in a known location in every frame, subframe, and/or slot.

Moreover, while downlink data has been discussed above, aspects of the subject matter described herein may be used to determine radio frame synchronization using uplink data. For example, to analyze uplink data, synchronization module 108 may be part of eNB 102 and may use additional and/or different processing. For example, synchronization module 108 may be configured to decode a physical channel or certain data that is readily ascertainable in every uplink frame or subframe. In this example, the physical channel or certain data in the uplink data may have a finite (e.g., small) set of possible values.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for determining a radio frame synchronization position, the method comprising:
  receiving a radio frame having an ascertainable physical channel or ascertainable data intended for providing non-synchronization related information; and
  determining, using the ascertainable physical channel or ascertainable data, a frame synchronization position, wherein determining the frame synchronization position includes:
  selecting a plurality of samples around an initial synchronization position;
  decoding a first physical control format indicator channel (PCFICH) value associated with a first sample of the plurality of samples;
  determining whether the first PCFICH value is within an error threshold; and
  in response to determining that the first PCFICH value is within the error threshold, identifying the frame synchronization position using the first sample.

2. The method of claim 1 wherein the ascertainable physical channel or ascertainable data includes a PCFICH or a channel intended for providing formatting or control information.

3. The method of claim 1 wherein the ascertainable physical channel or ascertainable data includes data that is frequently or regularly occurring in known or ascertainable locations of the radio frame.

4. The method of claim 1 wherein the ascertainable physical channel or ascertainable data includes data that is associated with a finite set of possible values.

5. The method of claim 1 comprising:
  providing synchronization feedback before, during, or after determining the frame synchronization position.

6. The method of claim 1 wherein determining the frame synchronization position includes determining an initial synchronization position and adjusting the initial synchronization position using decoded PCFICH values associated with surrounding positions.

7. The method of claim 6 wherein the initial synchronization position correlates a primary synchronization signal and a secondary synchronization signal.

8. The method of claim 1 comprising:
  in response to determining that the first PCFICH value is outside the error threshold, processing one or more different samples from the plurality of samples until a decoded PCFICH value associated with a particular sample is within the error threshold and in response to determining that the decoded PCFICH value is within the error threshold, identifying the frame synchronization position using the particular sample.

9. The method of claim 1 wherein the error threshold is associated with a bit mismatch error value, a phase error value, a combination of error values, or a combination of phase and amplitude error values.

10. The method of claim 1 wherein determining whether the first PCFICH value is within an error threshold includes determining that the first PCFICH value is decoded with no errors.

11. The method of claim 1 wherein the plurality of samples includes some samples before the initial synchronization position and some samples after the initial synchronization position.

12. The method of claim 1 wherein the radio frame is received from a testing platform, an evolved packet core (EPC) network node, a serving gateway, a packet data network gateway, an evolved Node B, a Node B, a WiMAX base station, an EPC network, or a base transceiver station (BTS).

13. A system for determining a radio frame synchronization position, the system comprising:
  a communications interface configured to receive a radio frame having an ascertainable physical channel or ascertainable data intended for providing non-synchronization related information; and
  a synchronization module including at least a processor and memory, wherein the synchronization module is configured to determine, using the ascertainable physical channel or ascertainable data, a frame synchronization position, wherein the synchronization module is configured to determine a frame synchronization position by:
  selecting a plurality of samples around an initial synchronization position;
  decoding a first physical control format indicator channel (PCFICH) value associated with a first sample of the plurality of samples; and
  determining whether the first PCFICH value is within an error threshold; and
  in response to determining that the first PCFICH value is within the error threshold, identifying the frame synchronization position using the first sample.

14. The system of claim 13 wherein the ascertainable physical channel or ascertainable data includes a PCFICH or a channel intended for providing formatting or control information.

15. The system of claim 13 wherein the ascertainable physical channel or ascertainable data includes data that is frequently or regularly occurring in known or ascertainable locations of the radio frame.

16. The system of claim 13 wherein the ascertainable physical channel or ascertainable data includes data that is associated with a finite set of possible values.

17. The system of claim 13 wherein the synchronization module is configured to provide synchronization feedback before, during, or after determining the frame synchronization position.

18. The system of claim 13 wherein the synchronization module is configured to determine the frame synchronization position by determining an initial synchronization position and to adjust the initial synchronization position using decoded PCFICH values associated with surrounding positions.

19. The system of claim 18 wherein the synchronization module is configured to correlate a primary synchronization signal and a secondary synchronization signal to derive the initial synchronization position.

20. The system of claim 13 wherein the synchronization module is configured to in response to determining that the first PCFICH value is outside the error threshold, process one or more different samples from the plurality of samples until a decoded PCFICH value associated with a particular sample is within the error threshold and to identify the frame synchronization position using the particular sample in response to determining that the decoded PCFICH value is within the error threshold.

21. The system of claim 13 wherein the error threshold is associated with a bit mismatch error value, a phase error value, an amplitude error value, a combination of error values, or a combination of phase and amplitude error values.

22. The system of claim 13 wherein determining whether the first PCFICH value is within an error threshold includes determining that the first PCFICH value is decoded with no errors.

23. The system of claim 13 wherein the plurality of samples includes some samples before the initial synchronization position and some samples after the initial synchronization position.

24. The system of claim 13 wherein the communications interface is configured to receive the radio frame from a testing platform, an evolved packet core (EPC) network node, a serving gateway, a packet data network gateway, an evolved Node B, a Node B, a WiMAX base station, an EPC network, or a base transceiver station (BTS).

25. A non-transitory computer readable medium comprising computer executable instructions embodied in the non-transitory computer readable medium that when executed by a processor of a computer control the computer to perform steps comprising:

receiving a radio frame having an ascertainable physical channel or ascertainable data intended for providing non-synchronization related information; and determining, using the ascertainable physical channel or ascertainable data, a frame synchronization position, wherein determining the frame synchronization position includes:

selecting a plurality of samples around an initial synchronization position;

decoding a first physical control format indicator channel (PCFICH) value associated with a first sample of the plurality of samples;

determining whether the first PCFICH value is within an error threshold; and in response to determining that the first PCFICH value is within the error threshold, identifying the frame synchronization position using the first sample.

* * * * *